June 21, 1949. A. B. SCHULTZ 2,474,124
PARACHUTE LEADER
Filed March 8, 1946
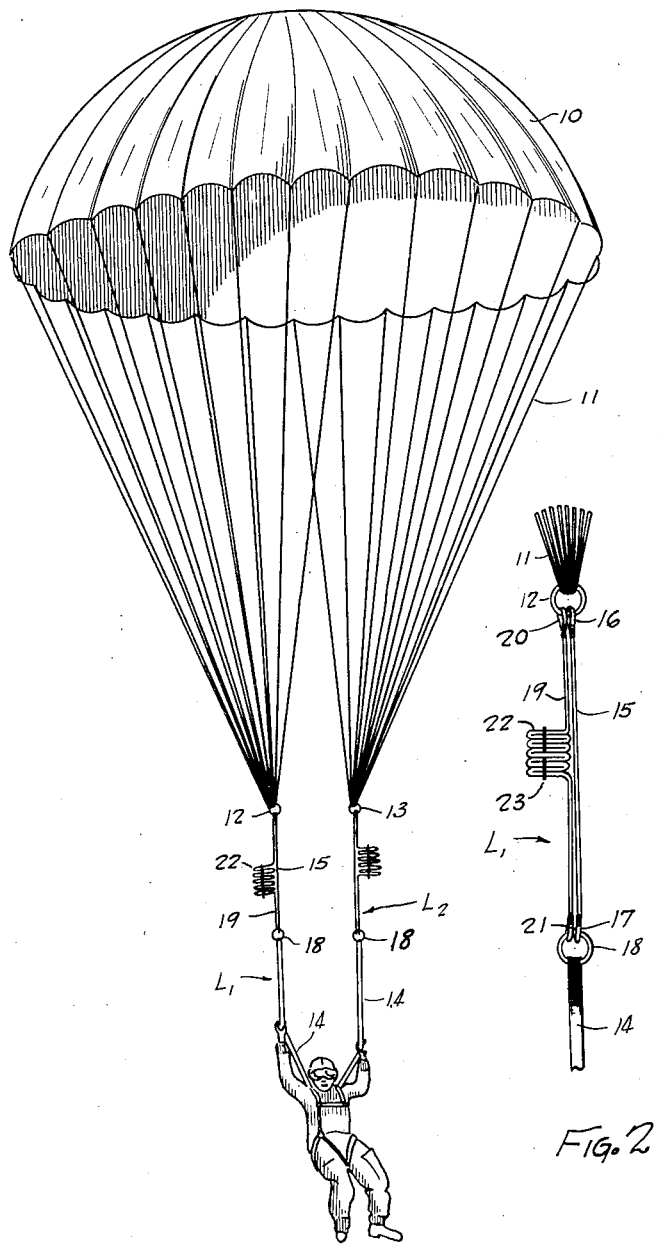
INVENTOR.
ARTHUR B. SCHULTZ
BY John A. Robertson
HIS ATTORNEY.

Patented June 21, 1949

2,474,124

UNITED STATES PATENT OFFICE 2,474,124

PARACHUTE LEADER

Arthur B. Schultz, Wilmington, Del., assignor to All American Airways, Inc., a corporation of Delaware Application March 8, 1946, Serial No. 653,015

3 Claims. (Cl. 244—151)

This invention relates to parachutes and is concerned primarily with the leader which ordinarily connects the shrouds of a parachute with the load that is supported by the parachute.

At the present time, parachutes such as are employed in controlling the descent of human beings and other loads from aircraft in flight have assumed certain standardized or conventional features of construction. Thus, a complete parachute assembly ordinarily comprises a canopy, the shrouds connected thereto, and one or more leaders which connect the load to the point or points where the shrouds are gathered.

In accordance with standard practice the parachute is not opened until the elapse of a predetermined interval after leaving the aircraft. This is because of obvious and well recognized reasons. When the parachute does open (the load has either been accelerated or decelerated, depending on circumstances) the load is traveling at a high speed and as a result is subject to a considerable shock when the parachute is opened.

The present invention has in view as its foremost objective the provision, in a parachute, of a novel leader which has energy absorbing properties. Thus, when the parachute is opened under conditions of practical usage the leader functions to absorb the initial shock and thereby obviate this heretofore undesirable factor. Not only is it important to absorb the shock but the shock absorbing must not be attended or followed by any rebound or sling-shot action. Thus, the use of any elastic material such as rubber is definitely precluded.

In carrying out this idea in a practical embodiment the invention proposes the use of synthetic plastic fibers in an unoriented or undrawn state as the material from which the leader is made. At the present time there is known and available to the public certain synthetic plastic fibers which in their undrawn condition have the required properties. Among these might be mentioned synthetic plastic fiber, such as nylon, polyethylene, Vinyon and Vinylite made from linear condensation polyamides.

Still another object of the invention is the provision of a parachute including a shock absorbing leader made from undrawn synthetic plastic fibers and which leader has the ability to draw and elongate an appreciable degree in absorbing shock. Paralleling this leader is an auxiliary supporting line or leader which limits the extent to which the synthetic plastic leader may be drawn. More in detail, the invention proposes an arrangement in which the auxiliary support is connected to the shrouds and load at its respective ends and gathered in a convenient way therebetween so that it may unfold or pay out as the shock absorbing leader elongates. When the auxiliary leader becomes taut it limits the extent to which the shock absorbing leader may be drawn.

Various other more detailed objects and advantages of the invention such as arise in connection with carrying out the above noted ideas in a practical embodiment will in part become apparent and in part be hereinafter stated as the description of the invention proceeds.

The invention therefore comprises a parachute including a shock absorbing leader that connects the shrouds to the load and which leader is made from undrawn synthetic plastic fibers. Paralleling this leader is an auxiliary leader of greater length than the shock absorbing leader in its original condition and which limits the extent to which the shock absorbing leader may be elongated.

For a full and more complete understanding of the invention, reference may be had to the following description and the accompanying drawing wherein:

Figure 1 is a perspective view of a parachute made in accordance with the precepts of this invention.

Figure 2 is an enlarged detailed view in elevation of a leader assembly before drawing, and Figure 3 is another enlarged detailed view of the leader assembly after drawing.

Referring now to the drawing wherein like reference characters denote corresponding parts and first, more particularly to Figure 1 a parachute is shown as comprising the usual fabric canopy 10 to the peripheral edge of which are connected shrouds 11. In the form of the invention illustrated in Figure 1 the shrouds 11 are shown as gathered at two points, i. e., one-half of the shrouds are gathered and connected to the ring 12 while the other half are gathered and connected to the ring 13. Obviously all of the shrouds could be gathered and connected to a single ring. This particular arrangement of the shrouds is intended as no limitation on the invention.

The load which is supported from the parachute in the illustrated embodiment is shown as a human being encased in the harness 14. Again it is noted that the particular load is not a limitation on the invention as any inanimate object might just as well be supported from the parachute.

A pair of leader assemblies connect the harness 14 to the shrouds. Thus, one leader assembly identified as $L_1$ connects the ring 12 to the harness 14 at an appropriate location on the latter and a second leader assembly $L_2$ connects the ring 13 to the harness in a similar manner. Inasmuch as the leader assemblies $L_1$ and $L_2$ are substantially duplicates, only one of them needs here to be described for the purposes of this specification.

Referring now more particularly to Figure 2, one of the leaders of the assemblies will be described in detail. A shock absorbing leader 15 is illustrated as being connected to the ring 12 by a loop 16. At the other end it is connected by a loop 17 to a ring 18 which is part of the harness 14. In accordance with this invention the leader 15 must have shock absorbing properties. It is therefore made from undrawn synthetic plastic fibers. Among the synthetic plastic fibers which in their undrawn or unoriented state have been found to have the required properties are products made from linear condensation polyamides, known generally as nylon, polyethylene, Vinyon, and Vinylite. Nylon may be taken as a preferred embodiment as undrawn nylon ordinarily has the ability to elongate in the neighborhood of four-hundred percent and while so elongating absorb energy. It is important to note that this elongation is not attended or followed by any rebound or recoil. It is a permanent stretching of the nylon leader. In order to provide a good safety margin the leader assembly will be so designed as to provide an elongation in the leader 15 of about two-hundred percent.

The auxiliary leader 19 may be made from any suitable non-elastic or substantially non-yielding material. A cotton or silken cord having the required tensile strength may be employed as the material from which the auxiliary leader 19 is made. The auxiliary leader 19 has a length considerably in excess of that of the leader 15 when the latter is in its undrawn condition. Thus, when provision is to be made for two-hundred percent elongation in the leader 15, the auxiliary leader in 19 will be three times as long as the leader 15. The leader 19 is connected at one end by a loop 20 to the ring 12 and at the other end by a loop 21 by the ring 18. Intermediate its extremities the auxiliary leader 19 is gathered as indicated at 22 and held in the gathered condition by a frangible fastener depicted at 23. This gathering of the auxiliary leader prevents any fouling during the opening operation.

While the manner in which the above described leader functions is believed to be obvious, it may be noted that when the parachute opens the load is suddenly placed on the shock absorbing leaders 15. Due to the nature of these leaders they draw or elongate and while so doing absorb the shock incident to the opening of the parachute. As the leaders 15 are drawn the frangible fasteners 23 are broken and the folded or gathered portions of the auxiliary leaders 19 pay out. When the parachute has been opened and supports the load the leader 15 will be drawn as shown in Figure 3 and the auxiliary leader 19 will have assumed the taut condition illustrated. It is evident that with this arrangement, the human being or other load is not subject to any sharp or sudden impact when the parachute opens.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. In a parachute a canopy, shrouds connected to the peripheral edge of said canopy, one-half of said shrouds being gathered and attached to a connecting ring, the other half of said shrouds being gathered and also attached to a second connecting ring, a load supporting harness, a pair of leader assemblies longitudinally extending from each connecting ring to said harness, each leader assembly comprising a shock absorbing leader made from undrawn synthetic plastic fiber, and a substantially non-yieldable auxiliary folded leader longer when unfolded than the undrawn synthetic plastic fiber leaders, said undrawn synthetic plastic fiber leaders each normally when not under load being equal in length to each of the said auxiliary leaders when in folded condition.

2. A shock absorbing device for coupling shroud lines of a parachute to body harness comprising a first folded flexible equalizing leader of non-elongatable material, means for normally retaining the said leader folded, a second flexible leader of shock absorbing elongatable non-elastic material longitudinally adjacent said first leader, said second leader normally being of substantially equal length to the said first leader when folded, and coupling members at each of the respective adjacent ends of the said first and second leaders connecting the same with the respective leader ends with the shroud lines and the body harness.

3. A shock absorbing device for coupling shroud lines of a parachute to body harness comprising a first folded flexible equalizing leader of non-elongatable material, means for normally retaining the said leader folded, a shock absorbing leader formed of undrawn synthetic plastic fibers susceptible of at least one hundred per cent elongation longitudinally adjacent said first leader, said shock absorbing leader being of substantially equal length to the first leader when in its folded condition, and coupling members for independently coupling each end of each leader to the shroud lines and the body harness, whereby upon application of predetermined loads from the harness coupling to the said leaders, said first equalizing leader gradually unfolds and said shock absorbing leader elongates in proportion to the amount of load applied and while so elongating absorbs shock.

ARTHUR B. SCHULTZ.

REFERENCES CITED

The following references are of record in the file of this patent:

UNITED STATES PATENTS

| Number | Name | Date |
| --- | --- | --- |
| 1,935,339 | Tricau | Nov. 14, 1933 |
| 2,112,614 | Wiley | Mar. 29, 1938 |
| 2,130,948 | Carothers | Sept. 20, 1938 |
| 2,450,328 | Cotton | Sept. 28, 1948 |

FOREIGN PATENTS

| Number | Country | Date |
| --- | --- | --- |
| 8,649 | Great Britain | 1915 |
| 549,953 | Great Britain | Dec. 15, 1942 |
| 603,242 | France | Jan. 7, 1926 |

OTHER REFERENCES

"The du Pont Magazine," for Jan.–Feb., 1944, pp. 18 and 19.